US005549986A

United States Patent [19]
Heiman et al.

[11] Patent Number: 5,549,986
[45] Date of Patent: Aug. 27, 1996

[54] BATTERY COVER AND MANIFOLD SYSTEM PROVIDING SPEW RESISTANCE AND EXPLOSION ATTENUATION CAPABILITIES

[75] Inventors: Jerome R. Heiman, Campbellsport; Gerald D. Slayton, South Milwaukee, both of Wis.

[73] Assignee: Globe-Union, Inc., Milwaukee, Wis.

[21] Appl. No.: 260,063

[22] Filed: Jun. 15, 1994

[51] Int. Cl.⁶ .................................................. H01M 2/08
[52] U.S. Cl. .......................... 429/175; 429/178; 429/87; 429/88; 429/89; 429/91; 429/225
[58] Field of Search .................................. 429/91, 87, 88, 429/89, 175, 178, 225

[56] References Cited

U.S. PATENT DOCUMENTS

| | | | |
|---|---|---|---|
| 3,597,280 | 8/1971 | Hennen | 136/177 |
| 3,879,227 | 4/1975 | Hennen | 136/170 |
| 3,915,753 | 10/1975 | Melone | 136/177 |
| 3,944,437 | 3/1976 | Auerbach | 136/179 |
| 4,009,322 | 2/1977 | Wolf | 429/175 |
| 4,098,963 | 7/1978 | Mocas | 429/89 |
| 4,278,742 | 7/1981 | Oxenreider et al. | 429/88 |
| 4,348,466 | 9/1982 | Elehen et al. | 429/88 |
| 4,851,305 | 7/1989 | Kump et al. | 429/175 |
| 4,916,034 | 4/1990 | Hulsebus et al. | 429/86 |
| 5,132,175 | 7/1992 | Mrotek et al. | 429/87 |
| 5,278,003 | 1/1994 | Francisco | 429/175 |
| 5,284,720 | 2/1994 | Thuerk et al. | 429/87 |
| 5,424,146 | 6/1995 | Lin | 429/175 |

Primary Examiner—Bruce F. Bell
Attorney, Agent, or Firm—Harness, Dickey & Pierce, P.L.C.

[57] ABSTRACT

A combined dual ganged manifold and cover arrangement for batteries features channeling of gas flow to an explosion attenuation device located between the manifolds and a cover designed for maximizing return to the battery of any electrolyte which may contact the cover from vibration, tilting, overheating, overcharge and the like. Splash barrels within the cover include a unique acid level indicator, and feet are provided on the manifold to prevent the manifolds from inadvertently being used with other cover designs. The arrangement is particularly useful for batteries having terminal posts lying along the battery centerline. The cover utilizes external and internal gas pick-up systems and perpetual hill and infinite well concepts to control acid flow. A narrow channel reduces standing wave electrolyte surface violence.

28 Claims, 5 Drawing Sheets

BATTERY COVER AND MANIFOLD SYSTEM PROVIDING SPEW RESISTANCE AND EXPLOSION ATTENUATION CAPABILITIES

BACKGROUND OF THE INVENTION

1. Field of the Invention

The present invention relates generally to the art of electric storage batteries, for example automotive and truck batteries. More particularly, the invention relates to manifold vent caps and covers for such batteries which provide a flow path for the escape of hydrogen and oxygen formed during the electrochemical reactions which take place in such batteries, as well as resistance to acid spewing. Still more specifically, the invention relates to a vent cap manifold which directs the flow of gas to an explosion attenuation device and a cover design which retains electrolyte and ensures its return to the battery cells so that it will not become entrained in the flow of gases passing through the manifold or flow through the manifold to the attenuation exhaust port.

2. Description of the Prior Art and Technical Problems

Conventional lead-acid batteries, such as those used for automobiles and trucks, generally include a number of cells disposed in a battery housing. Each cell typically includes a plurality of positive and negative battery plates or electrodes, and separators are sandwiched between the plates to prevent shorting and undesirable electron flow during the reactions which take place during manufacture and use of the batteries. The plates and separators are immersed in a liquid electrolyte in the cells, the most common being aqueous sulfuric acid. The positive plate generally is constructed of a lead-alloy grid covered with lead oxide, while the negative plate generally contains lead as the active material, again covering a lead alloy grid.

In most battery constructions the battery housing includes a box-like base to contain the cells and which is made from a moldable resin. The housing is generally rectangular in horizontal cross-section, the cells being provided by vertical partitions within the housing. A cover is provided for the casing, the cover including terminal bushings and a series of filler holes to allow electrolyte to be added to the cells and to permit whatever servicing is required. To prevent undesirable spillage of electrolyte from the fill holes, most prior batteries have included some sort of filler hole cap.

The electromotive potential of each battery cell is determined by the chemical composition of the electroactive substrates employed for the electrochemical reactions. For lead-acid batteries, such as those described above, the potential is usually about two volts per cell, regardless of cell volume. Vehicles manufactured by original equipment manufactures (OEM's) typically require twelve volt batteries, so most of today's batteries include six cells (6 cells×2 volts per cell=12 volts). The size of the housing for the battery is selected for the "envelope" for a particular vehicle, i.e. the physical dimensions defined by the vehicle manufacturer for containment of the battery in the engine compartment.

Battery electrolyte spillage or spewing can be caused by a number of factors, including vibration or tilting as a vehicle maneuvers during normal use. Electrolyte escape may also be caused by battery overheating, a problem especially pronounced in recent years with smaller engines, which tend to run hotter than prior engines.

In addition to preventing spillage or spewing of electrolyte from the cells, the battery cover design and the filler caps need to perform an important and different function. This is because gases are liberated from lead-acid batteries during the charge and discharge reactions. Such reactions start at the time the battery is originally charged (called "formation") by the manufacturer or by the retailer or vehicle manufacturer. They also occur during normal operation of the battery. Factors such as high current charge and discharge conditions, and changes in temperature, can affect the rate at which gas evolution occurs. Control of gas generation and evolution in lead-acid battery construction is particularly important, because the gases are hydrogen and oxygen, and it is important to vent such gases in a controlled way from the battery to prevent pressure buildups in the housing which could lead to electrolyte leaks, housing failures, or most significantly explosions within the housing. It is also desirable, and well known, to prevent an external flame from entering the battery through gas exhaust ports.

As will soon become apparent, many prior art devices are known for venting gases from battery cells in a manner which allows diffusion of the potentially explosive hydrogen gas. It will also become apparent that prior attempts provide vent caps or covers with a flame or spark blocking material, generally known as an explosion attenuation element. However, it will also be seen that the focus of such prior art caps is on gas venting and the exhaust thereof through an explosion attenuation media.

The two problems previously mentioned, i.e. electrolyte spewing and gas evolution, are really interrelated and important in the construction of an effective cover and vent system. For example, electrolyte may enter the vent cap through several mechanisms. One mechanism is through vibrational or tilting flow of electrolyte into the cap, and another is through a mechanism frequently referred to as pumping. The latter occurs when gas evolved in the battery bubbles from the cells and carries or forces electrolyte out the fill hole and into the cap. When electrolyte enters the caps of some prior designs it may be carried out the exhaust passageway and cause damage to external battery components, such as the battery terminals or adjacent engine components.

Original equipment manufacturers are beginning to recognize the importance of the dual function performed by vent caps and covers and have instituted a number of testing specifications designed to ensure electrolyte retention in the cells. One such test involves tilting a battery 35° about the longitudinal center line of the battery under vibration load in both directions. This test is quite severe and could not be passed by a number of the prior art batteries using the vent constructions referred to below.

In Hennen, U.S. Pat. No. 3,597,280, issued Aug. 3, 1971, a "Multiple Vent Plug Assembly" is described which includes three vent barrels entering three separate compartments, each of which is vented to the atmosphere. Circular baffles and other internal design features obstruct electrolyte to keep it from flowing to the vents.

Another patent issued to the assignee of the present invention is Hennen's U.S. Pat. No. 3,879,227 entitled "Battery Vent Plug." This ganged plug (multiple fill holes capped by a single vent cap or manifold) features downwardly directed barrels for the fill holes and conical or sloping bottoms around drain opening which themselves include a slanted point to facilitate dripping of electrolyte into the cells. Gases follow a tortuous path through a porous diffuser adjacent the gas outlet. Semicircular baffles also surround each opening into the vent cap to facilitate directing electrolyte to the lowermost tip of the drain barrels. The gas pathway through the diffuser is upwardly. In one embodiment an open bottom tube is suspended from the top of the vent cap housing and depends downwardly over and is spaced above the cell vent opening.

Different explosion attenuation devices for single cells are disclosed in Melone, U.S. Pat. No. 3,915,753, issued Oct. 28, 1975 and entitled "Liquid Indicator for a Storage Battery with a Flame Barrier Vent Filter" and Auerbach, U.S. Pat. No. 3,944,437, issued Mar. 16, 1976 entitled "Explosion Proof Venting Device for Electrical Storage Batteries." Both provide tortuous flow paths for gases leaving the battery. The former additionally provides a liquid level indicator, while the latter provides a catalyst in the diffusion material to assist in the recombination of hydrogen and oxygen gases generated within the battery.

Oxenreider, et al., in U.S. Pat. No. 4,278,742, issued Jul. 14, 1981 and entitled "Manifold Vented Battery Cover," also illustrates a battery cover employing a labyrinth design formed between two cover components which together form individual chambers for each battery cell, the chambers being interconnected by ports.

Other explosion attenuation vent caps are described in commonly owned U.S. Pat. No. 4,916,034, issued Apr. 10, 1990 to Hulsebus, et al. and entitled "Battery Vent Strip." In this device, a vent cap includes a series of barrels with a strip extending transversely to the line of barrels, the strip including a porous explosion attenuation material. A plurality of channels couple the cells to the flame arrestor. Splash guards are provided to reduce electrolyte leakage into the exhaust flow path and the flame arresting material.

A different type of cap is shown in commonly assigned U.S. Pat. No. 5,284,720, issued Feb. 8, 1994 to Thuerk, et al. and entitled "Vent Cap With Electrolyte Drain And Explosion Attenuation Capabilities." This device includes a vent cap having a sloping floor drain, a baffle system and a gas entrance for the attenuation device located above the battery centerline.

One current design of battery cover used for truck batteries includes a molded cover having six holes, one for each battery cell. Horizontal holes within the cover interconnect the head space above each cell to allow gases to pass toward an explosion attenuation device. The holes are prepared during the molding process by passing a rod through the mold. Individual, screw-in type filler caps are employed for each of the openings. The cover further includes an internal passageway for coupling these holes, through a baffle and leading to an explosion attenuation device. The passageway includes a slanted floor and a single opening and a single exit. The device is better than many designs which are currently in use but suffers from manufacturing difficulties due to problems resulting from the rod/mold combination. Moreover, the screw-in caps do not provide the advantages of gang type systems, and the passageway design is not entirely efficient in returning acid to the battery in certain tilt orientations.

While a number of different solutions have been proposed in the aforementioned patents to the technical problems discussed earlier in this section of the specification, optimization has still not been achieved, especially in batteries which employ centerline terminal posts.

An improved vent cap and cover construction for minimizing the possibility of electrolyte leakage from the battery and for inhibiting the introduction of sparks or flame into the battery and efficiently directing gases from the battery would represent a substantial advance in this art.

SUMMARY OF THE INVENTION

The present invention provides a vent cap and cover construction which includes a two piece construction adapted to facilitate electrolyte return to the battery, and to minimize electrolyte entrainment in the exhaust flow path and facilitate distribution of electrolyte to a plurality of battery cells.

More particularly, the present invention features a cover for a battery which includes a passageway having a pair of holes therein to provide the benefits of an infinite well and perpetual hill to facilitate draining of electrolyte back into the battery cells no matter what the tilt orientation of the battery. In connection with the passageway, an exit is provided generally adjacent the centerline of the battery for gas to escape toward an explosion attenuation device and eventually to an external vent.

Also, the invention features a ganged manifold for fitting into two or more battery filler holes in the battery cover, which manifold or vent cap includes a passageway system for directing gases which may be generated in any of the battery cells to the aforementioned passageway for escape from the battery through the attenuation device.

The present invention also features a novel construction for the filler holes, which construction readily facilitates a determination as to whether a sufficient amount of acid remains in the cells or whether an excess of acid is present.

The present invention further features a construction for the ganged vent caps which prevents them from being inadvertently used with batteries and covers for which they were not specifically designed. This benefit is especially important in the manufacturing operations where a single plant may be producing a variety of battery sizes and configurations and utilizing a variety of ganged vent caps.

How the present invention provides the various features described above will be set forth in the following detailed description of the preferred embodiment, taken in conjunction with the Figures. Generally, however, the present invention features several components which are specially designed to provide the features and which may be adapted to a variety of battery sizes and configurations. With respect to the cover, battery acid level indicators are built into the filler holes to readily allow someone to determine whether there is insufficient or excess acid within a particular cell. The cover also includes an internal passageway which, in the illustrated embodiment, extends perpendicularly to the longitudinal centerline of the battery and which has an interior baffle system and a hole at either end thereof. The holes allow battery acid to enter the passageway in certain battery tilt orientations and quiet any standing wave vibrations which may arise during use of the battery. Since the openings are provided at opposite ends of the battery, the acid is free to drain back into the cells no matter what the orientation, if acid reaches the opposite end of the passageway, it will flow through a baffle system and past an escape passage leading to the explosion attenuation device. This orientation of the passageway with two openings provides the benefits of an infinite well and a perpetual hill, leading to effective separation of electrolyte from any gases which may be present.

The features of the invention are also accomplished by providing a gang-type manifold vent cap for extending into at least two of the battery cells and designed to direct the flow of gases which may be generated within the cell toward the attenuation device. A series of openings couple the individual cells to an exit passage leading from the manifold to a passageway leading to the explosion attenuation device.

Further, the benefits are accomplished by providing a bottom structure on the manifold which prevents manufacturing personnel from using the manifold with covers other than those for Which the manifold was specifically designed. This is an important feature in manufacturing operations where it is common for a single manufacturing plant to produce a variety of battery casings, covers and caps and where the use of an improper cap for a particular cover could result in manufacturing losses.

Other ways in which the features of the present invention are accomplished will be described in further detail in following sections of the specification. Some of such other ways would be readily apparent to those skilled in the art after the present invention has been read and understood. Accordingly, such other ways, as well as various modifications which are discussed herein are deemed to be within the scope of the present invention if they fall within the scope of the claims which follow.

BRIEF DESCRIPTION OF THE DRAWINGS

In the various Figures, like reference numerals are used to indicate like components.

DETAILED DESCRIPTION OF THE PREFERRED EMBODIMENT

Before proceeding to the detailed description of the preferred embodiment, several general comments are warranted with regard to the applicability and the scope of the present invention.

First, the present invention is illustrated in connection with a center post battery, a configuration which is commonly used at the present time in connection with certain truck batteries. However, the principles of the invention could readily be adapted to side or front terminal post configurations.

Second, the present invention is illustrated in connection with a 6-cell battery having six filler holes and wherein the holes are capped by a pair of 3-barreled vent caps or manifolds (terms which are used interchangeably herein). The invention could easily be adapted to batteries having a different number of cells, such as 4 or 8 cells.

Third, while the cover passageway and manifold design are best used with each other, they could be used separately for other types of batteries. For example, the passageway utilizing the infinite well and perpetual hill concepts may not be necessary for batteries which are not subject to frequent tilting or other types of gas escape designs could be combined with the passageway system without departing from the intended scope of the invention.

Fourth, the particular arrangement of the bottom of the vent manifold is for manufacturing optimization and could be eliminated without departing from the scope of the invention.

Finally, the illustrated acid level indicator is preferred but could be employed in batteries having totally different acid containment and gas control systems. Also, other types of acid level indicator systems could be used in the battery which is illustrated in the present specification, without in any way departing from the invention's intended scope.

Figure 1:
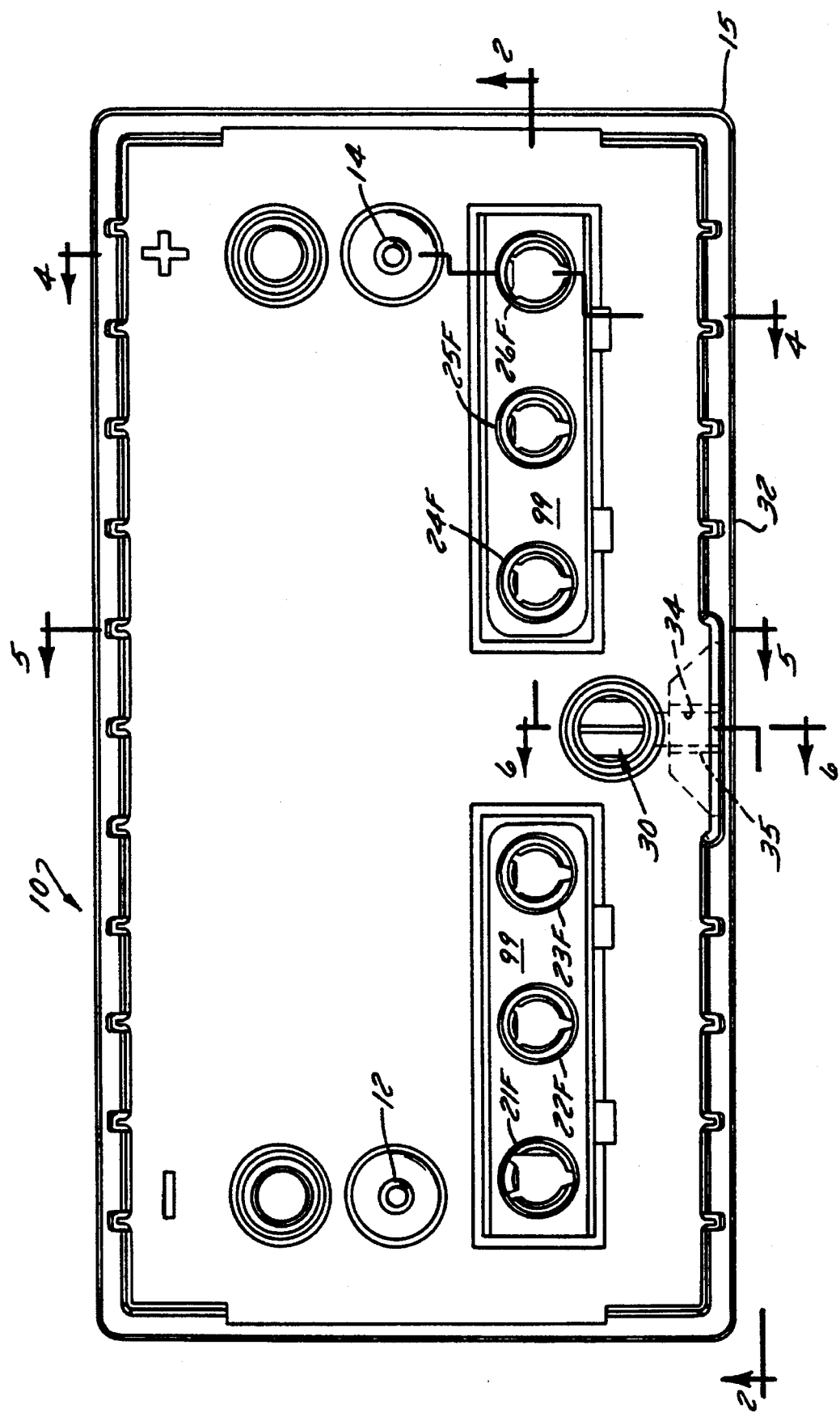
FIG. 1 is a top view of a battery cover according to the most preferred embodiment of the present invention.

Proceeding now to a description of the most preferred and illustrated embodiment of the present invention, the cover component is illustrated in top view in FIG. 1. The cover 10 is adapted to fit over a conventional battery casing (not shown) of the type which includes six cells for containing battery plates, separators and electrolyte. In the illustrated, rectangular configuration, cover 10 includes a negative terminal post 12, a positive terminal post 14, and it will be noted that in this particular battery configuration, the terminals 12 and 14 lie generally along the centerline of the battery. This type of terminal arrangement is commonly used in truck batteries, but it may be used for other battery designs as well. Cover 10 is typically made from the same type of material used for conventional batteries, namely polyethylene or polypropylene materials which are able to withstand the harsh environment of lead-acid batteries. As shown best in FIGS. 2 and 3, a lip 15 is provided around the edge of cover 10 to allow the cover to be attached to the casing in a conventional manner, i.e. by an adhesive or by welding of the plastic material of the cover to the plastic material of the casing. The attachment of the terminals to the electrodes of the battery cells located beneath cover 10 will not be explained in detail, as those components, in and of themselves, are not part of the present invention. It will be understood, however, that the negative plates of the cell located beneath negative terminal post 12 will be coupled electrically to that terminal post, while the positive plates of the cell located beneath positive terminal post 14 will be similarly coupled to that terminal post.

Figure 2:
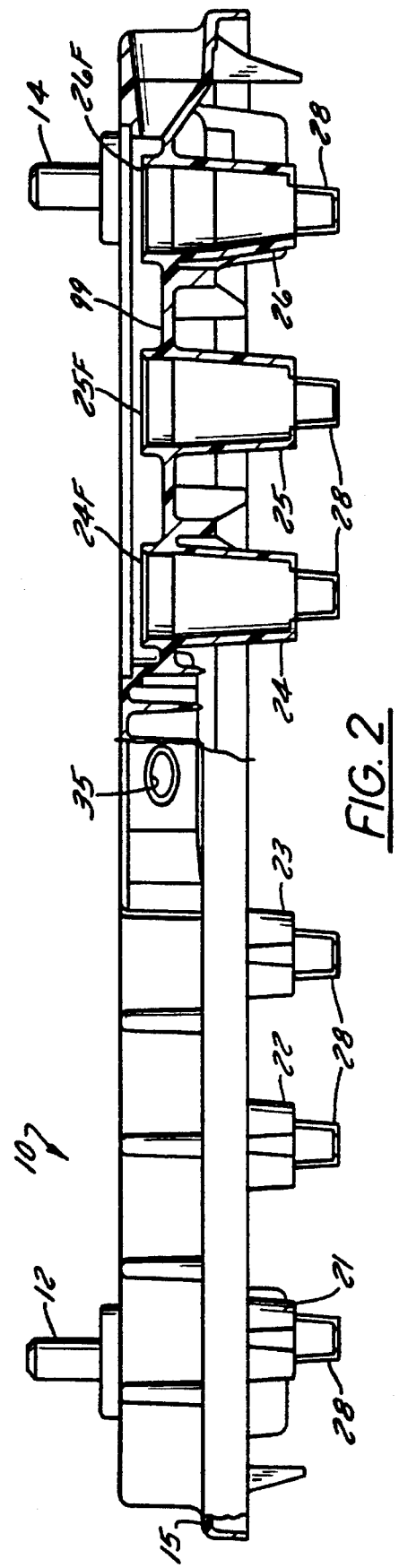
FIG. 2 is a partial front and partial sectional view taken along the lines 2—2 of FIG. 1.

Cover 10 includes six splash barrels numbered 21, 22, 23, 24, 25 and 26 as illustrated best in FIG. 2. It should be understood here that the construction of the splash barrels is unique and forms a separate component of the present invention, but more will be said about this feature in connection with the description of later drawings. Generally, however, splash barrels 21–26 extend downwardly from the surface cover 10 and into a space located above the battery components of the six cells located beneath the cover. Six fill holes 21F, 22F, 23F, 24F, 25F and 26F are illustrated in FIG. 1 and extend through the barrels from the upper surface of the cover to the lower end of the barrels. From the top view, it will be apparent that the openings 21F–26F are not circular throughout the length of the barrels, although they are generally cylindrical and decrease in size from the top of cover 10 to a smaller constricted portion 28 located at the bottom of each barrel. Again, the particular construction of the barrels will be better understood by reference to FIG. 4.

Another feature of cover 10 shown in FIG. 1 is an explosion attenuation device 30 shown located generally between filler holes 23F and 24F and nearer a side 32 of cover 10. Device 30 may be of conventional design and is not shown in detail as in and of itself, it does not form part of this invention. It would, however, typically include a plug of attenuation material and gas flow passages necessary to permit battery gases to be vented to a plug outlet. Such outlet is, in turn, coupled to a passageway 34 extending from the attenuation device 30 and opening at 35, as illustrated best in FIG. 2. The coupling of the attenuation device 30 to the space beneath cover 10 is an important feature of the present invention and will be appreciated as the description continues.

Figure 3:
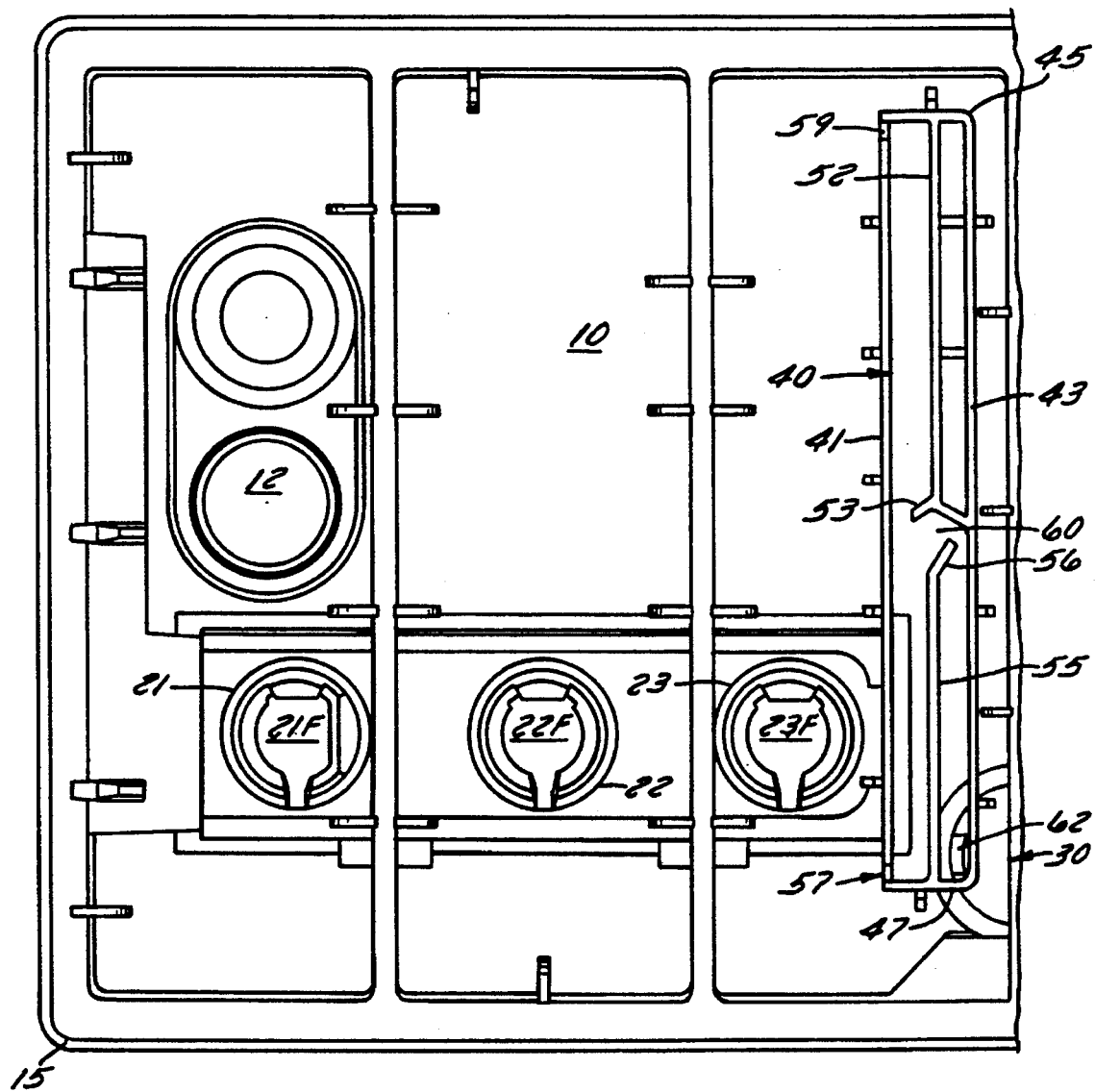
FIG. 3 is a bottom view of one half of the cover shown in FIG. 1, the bottom plate of the partition being removed from the gas flow passageway to show the internal construction thereof.

Proceeding next to FIG. 3, a portion of the bottom of cover 10 is shown including fill holes 21–23, terminal 12 and rim 15. Also shown is a passageway 40 which extends generally transversely to the longitudinal centerline of the cover and which is defined by a pair of side walls 41 and 43, and a pair of end walls 45 and 47. Passageway 40 is closed on its top (the bottom in this view) by the lower surface of the top of cover 10 and on its lower surface (the upper surface in this view) by a generally planar, slightly inclined and rectangular plate 50 shown best in FIG. 5.

Passageway 40 also contains an interior baffle system including a first divider wall 52 extending from end wall 45 to approximately the midpoint of the passageway 40, at which point a short angled wall 53 extends toward but does not touch wall 41. The baffle system also includes another divider wall 55 extending from end wall 47 and terminating in an angled, short section 56 which extends toward but does not touch side wall 43. These walls extend between plate 50 and the lower surface of the top of cover 10.

Also shown in FIG. 3 are a pair of openings 57 and 59, opening 57 extending into the area between wall 41 and wall 55 generally adjacent end wall 47, while opening 59 extends into the space defined by wall 41 and wall 52 generally adjacent end wall 45. It can be stated here that any gas which may enter either hole 57 or 59 will be directed toward the attenuation device 30, only a portion of which is shown in FIG. 3, by flowing through the baffle system and eventually through the open area 60 located between short angled sections 53 and 56. Gases then flow downwardly between the space defined by side wall 43 and wall 55 to an opening 62 leading to the chamber which holds the attenuation device 30, all as will be shown in greater detail in connection with other Figures.

Figure 4:
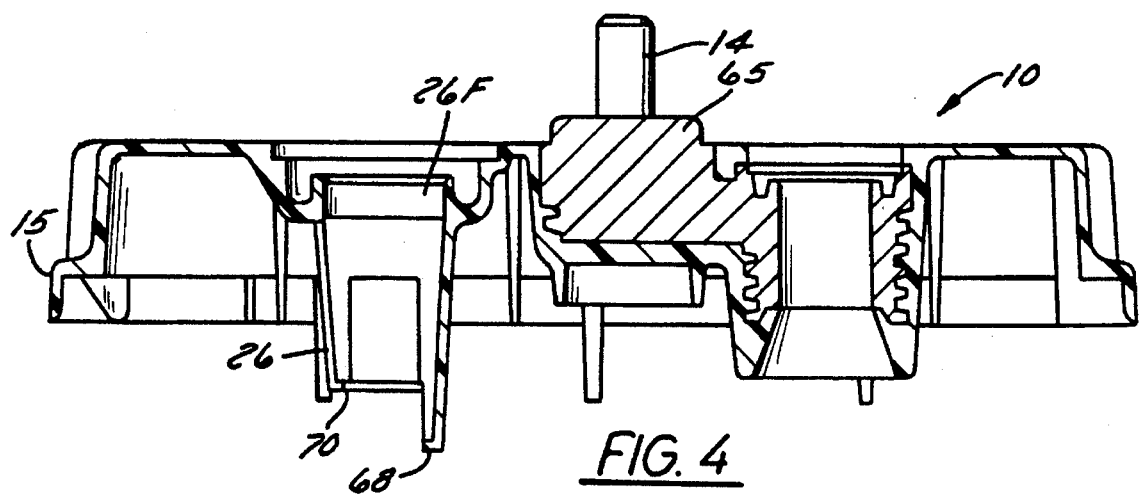
FIG. 4 is a sectional view taken along the line 4—4 of FIG. 1.

The description of cover 10 can further be explained by reference to FIGS. 4–6, several sectional views taken through lines 4—4, 5—5 and 6—6, respectively, of FIG. 1. FIG. 4 shows clearly the terminal post 14, as well as the conductive material (typically lead) 65 located beneath cover 10 and adapted to be connected to the positive plates in the cell located beneath this terminal. Shown in greater detail in this Figure are the components of splash barrel 26 located beneath filler hole 26F. More particularly, note the location of two horizontal extensions which are part of this barrel, one being at the bottom and being identified by reference numeral 68 and the other being located above extension 68 and being designated as 70. The space between these two components is preferably about 0.375 inches. It will be appreciated by reference to FIG. 4 that someone viewing the contents of the battery (not shown) through filler hole 26F located beneath cover 10 will be able to determine whether the level of acid is above or below each of extensions 68 and 70. By making such observation, it can be determined whether less acid is present in the cell than is desirable (where both extensions are visible), if too much acid is present (when neither extension is visible), or if the correct amount of acid is present when the upper extension 70 is visible but the lower extension 68 is not.

Figure 5:
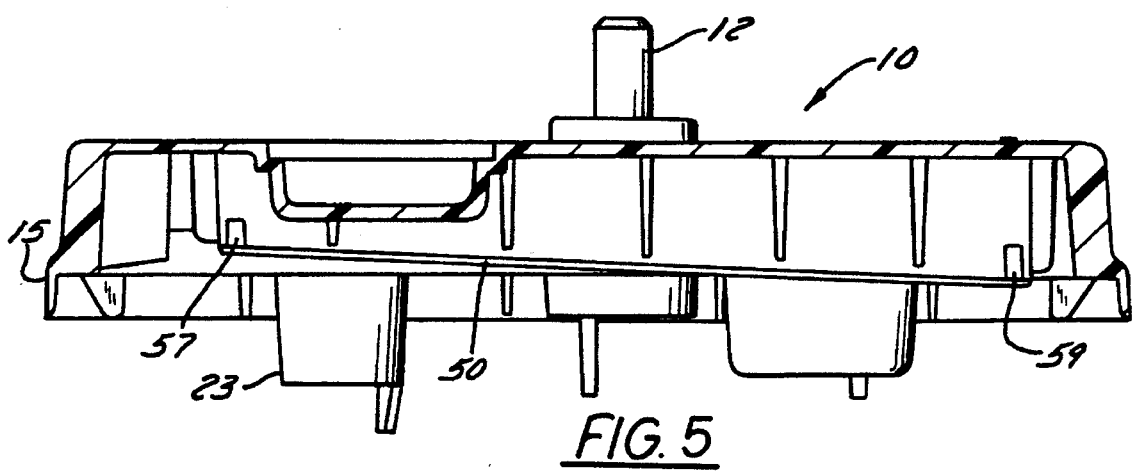
FIG. 5 is a sectional view taken along the line 5—5 of FIG. 1.

FIG. 5 best shows plate 50, which extends at a slight angle with respect to the upper surface of cover 10, and it also shows another view of openings 57 and 59 to passageway 40.

Figure 6:
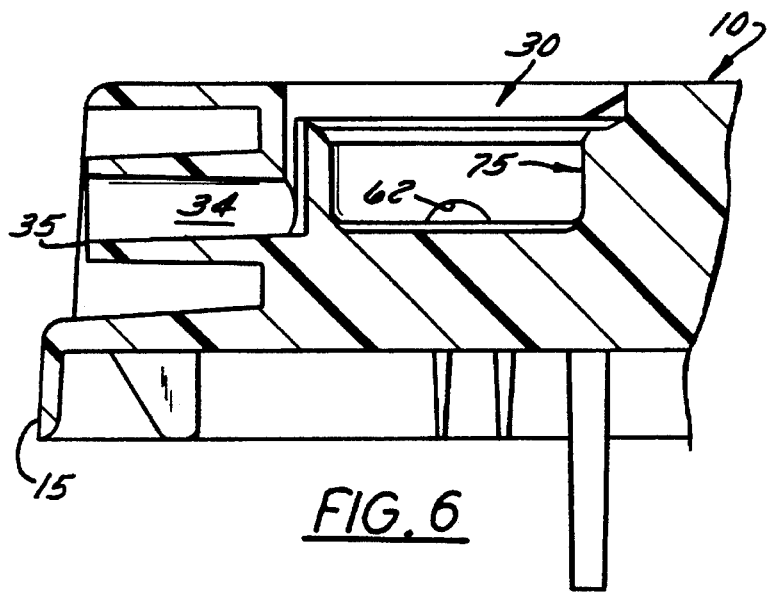
FIG. 6 is a partial sectional view taken along the line 6—6 of FIG. 1.

Finally, FIG. 6 shows, in sectional view, the chamber 75 for housing the attenuation device 30 which is illustrated later in connection with FIGS. 10 and 11. The passageway 34 is clearly illustrated in this Figure, as is the outlet 35. Also shown in this sectional view is the opening 62 between passageway 40 and the chamber 75. It can be mentioned here that once the attenuation device is inserted into chamber 75, it will receive gases not only through opening 62, but also gases which are collected by a manifold coupling the filler openings 21F–26F in a manner which will become apparent as the manifold itself is described. Also it should be appreciated that a second passageway 40 having an opening 62 will be located on the other half of cover 10, this opening also extending into chamber 75.

Figure 7:
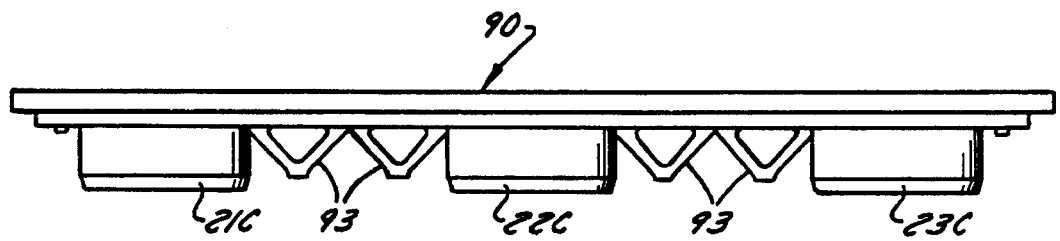
FIG. 7 is a side view of a manifold for use with the cover of FIG. 1.

One of the two manifolds useful in the present invention is shown as reference numeral 90 in FIG. 7. It will be noted that manifold 90 includes three filler caps 21C, 22C and 23C, the illustrated manifold being for use on the left side of the battery cover 10 as shown in FIG. 1. Also prominent in FIG. 7 are legs 93 which are molded into the plastic manifold and which are shown in greater detail in FIGS. 8 and 9. It will be apparent that filler cap 21C will be pressed into filler opening 21F, cap 22C into filler opening 22F, etc. It will also be apparent that a similar manifold 90 will be provided for filler holes 24F–26F on the opposite side of the cover 10.

Figure 8:
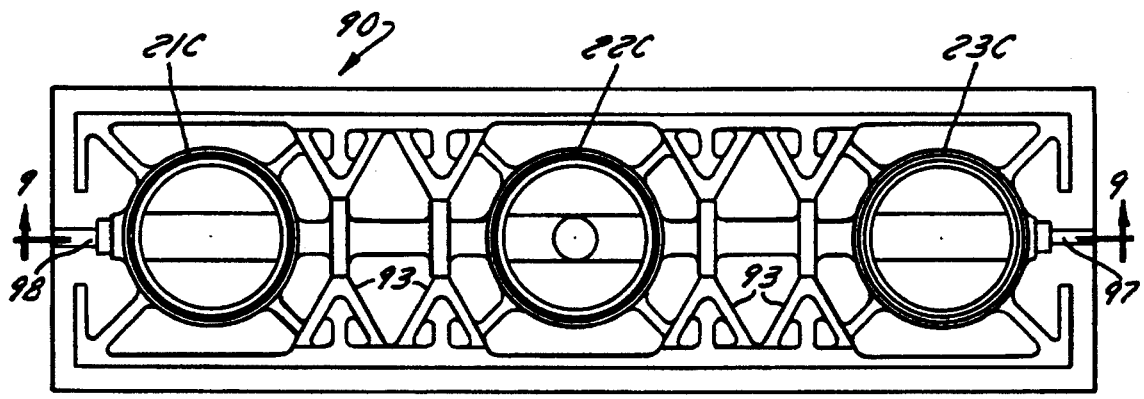
FIG. 8 is a bottom view of the manifold shown in FIG. 7.
Figure 9:
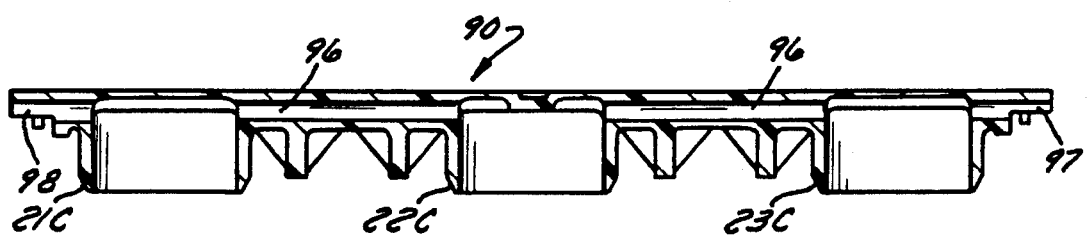
FIG. 9 is a cross-sectional view taken along the line 9—9 of FIG. 8.

What is especially important with regard to manifold 90 is a passageway 96 (shown best in FIG. 9) which extends across the entire length of the manifold and which has an open end 97 at the right side thereof, as depicted in FIGS. 7–9. The purpose of passageway 96 is to convey gases which may be evolved in the cells located below filler caps 21C–23C to the attenuation device through passageway 96 and out opening 97. During the molding process used to prepare manifold 90, the opposite end 98 of the passageway is ultrasonically sealed to prevent escape of gases from that area. It will also be apparent, especially from FIG. 2, that when a manifold 90 is in place on cover 10, opening 97 will extend into chamber 75 defining the receptacle for the attenuation device described later in connection with FIGS. 10 and 11. Accordingly, no matter where gases are generated within the battery, the gases will be directed toward the two most interior cells (those beneath filler openings 23F and 24F) for passage toward the attenuation device and out opening 35.

Before leaving the description of FIGS. 7–9, it should be mentioned that the feet 93 are specially constructed to fit within locations 99 designated in FIG. 2 so as to allow the filler caps 21C–23C to fit down into the splash barrels 21–23. The combination of the receptacles 99 and the feet 93 ensure a tight fit, but it also ensures that the manifold 90 could not be used with other batteries which did not have the receptacles 99. Accordingly, costly manufacturing errors are avoided, especially in plants which may in a given period of time be manufacturing a variety of battery sizes, involving different covers and different manifolds.

Before proceeding to a description of the preferred explosion attenuation device shown best in FIGS. 10 and 11, a description can now be given of the concepts of the infinite well and perpetual hill. The terms are used to describe the situation which exists in passageway 40 during any particular tilt orientation of the battery. By way of example, assume that the battery is tilted about its longitudinal centerline toward edge 32. Acid electrolyte will accumulate in the area around opening 57 and have to "climb" along the passageway between walls 41 and 55 before it could ever be able to reach area 60 between the two slanted sections 53 and 56. The acid would be in the well of electrolyte contained within the cell located below the passageway. Gases, on the other hand, could freely enter opening 59 because it is unobstructed by electrolyte, and a flow path is provided between that opening and opening 62.

Next, assume that the battery is tilted in the opposite direction around the centerline, in which case the phenomenon would be reversed. There would always be a perpetual hill for electrolyte to climb to reach the space 60 into the attenuation device, while opening 57 would be available for gas to flow toward opening 62.

It should also be noted from the various drawings that the narrow passageways which exist within passageway 40 quiet standing vibrations of electrolyte within the passageways, facilitating return of the electrolyte to individual battery cells. Moreover, if the battery was to spew into either opening 57 or 59, the natural tendency would be for it to run along the channel defined by side wall 41 and interior walls 52 and 55 towards the opening at the opposite end, thereby serving to facilitate return of electrolyte to the cells.

What is claimed is:

1. A battery cover for a battery casing having a plurality of electrolyte containing cells, the cover having a longitudinal axis and a plurality of spaced apart fill holes for the cells arranged in a line parallel to the longitudinal axis, the cover having an upper surface and a lower surface and an explosion attenuation device mounted therein, an exhaust passageway extending from the attenuation device, the cover further comprising at least one elongate passageway located on the lower surface and having a pair of spaced apart inlet openings and an outlet opening in gaseous communication with the attenuation device, the elongate passageway being arranged perpendicularly to the longitudinal axis.

2. The cover of claim 1, wherein two elongate passageways are provided which are parallel to and spaced apart from one another, each passageway being in gaseous communication with the attenuation device.

3. The cover of claim 1, wherein the inlet openings are located near opposed ends of the elongate passageway.

4. The cover of claim 1, wherein each elongate passageway includes an internal baffle system which minimizes flow of electrolyte from the inlet openings to the outlet opening.

5. The cover of claim 1, wherein each elongate passageway is defined by a pair of spaced apart elongate side walls, a pair of end walls coupling the side walls, the lower surface of the cover and a plate member.

6. The cover of claim 5, wherein each elongate passageway includes an internal baffle system which minimizes flow of electrolyte from the inlet openings to the outlet opening.

7. The cover of claim 6, wherein the baffle system includes at least two intermediate walls located parallel to and between the side walls and defining an opening from one side of the elongate passageway to the other, the outlet opening being located on the opposite side of the passageway from the inlet openings.

8. The cover of claim 5, wherein the inlet openings are both provided in one of the side walls.

9. The cover of claim 1, wherein six fill holes and a pair of elongate passageways are provided, the latter being located in the vicinity of the third and fourth fill hole.

10. The cover of claim 1, wherein a splash barrel is provided beneath each fill hole.

11. The cover of claim 10, wherein each splash barrel includes means for indicating the electrolyte level within the casing cells.

12. The cover of claim 11, wherein the level indicating means includes a first horizontal ledge located at the end of the splash barrel remote from the lower surface of the cover and second horizontal ledge located intermediate the first horizontal ledge and the lower surface of the cover.

13. A cover for a battery casing of the type including a rectangular casing divided into a plurality of battery cells containing electrolyte, the cover including spaced apart terminal posts and a row of fill holes, one for each of the cells, the cover also including an explosion attenuation device having an inlet and an outlet, the cover further including at least one elongate passageway located on a lower surface of the cover and above a cell, the passageway being arranged perpendicularly to a line extending through the row of fill holes, each passageway having a pair of inlet openings spaced apart along its length and an outlet opening in gaseous communication with the inlet to the attenuation device.

14. The cover of claim 13, wherein six fill holes and two elongate passageways are provided.

15. The cover of claim 14, wherein each passageway is located adjacent a middle one of the fill holes.

16. The cover of claim 13, wherein each elongate passageway includes an internal baffle system which minimizes flow of electrolyte from the inlet openings to the outlet opening.

17. The cover of claim 13, wherein a splash barrel is provided beneath each fill hole.

18. The cover of claim 17, wherein each splash barrel includes means for indicating the electrolyte level within the casing cells.

19. The cover of claim 18, wherein the level indicating means includes a first horizontal ledge located at the end of the splash barrel remote from the lower surface of the cover and second horizontal ledge located intermediate the first horizontal ledge and the lower surface of the cover.

20. A battery cover and manifold system, the cover including a plurality of battery fill holes, the manifold including an elongate body and a plurality of generally cylindrical fittings snugly inserted into the fill holes, a passageway extending along the length of the manifold and being open on one end, the passageway also being in gaseous communication with each of the barrels.

21. The system of claim 20, wherein the cover includes an explosion attenuation device having means for admitting gases thereto and means for exhausting gases therefrom, the open end of the manifold passageway being in gaseous communication with the means for admitting.

22. The system of claim 21, wherein the means for admitting gases includes a chamber and the manifold passageway is open to the chamber.

23. The system of claim 20, wherein the cover includes an upper surface including receiving areas and the manifold body includes structure arranged and adapted to be snugly received within the receiving areas, whereby the manifold and cover are constructed for exclusive use with one another.

24. A battery cover and manifold system wherein fill holes are provided in the cover and means are provided on the manifold for being inserted into the fill holes, the cover including an upper surface including receiving areas and the manifold including a structure snugly received within the receiving areas, whereby the manifold and cover are constructed for exclusive use with one another.

25. The system of claim 24, wherein the cover and manifold are formed from thermoplastic resins and wherein the receiving areas comprise receptacles in the cover and the structure comprise feet on the manifold.

26. An electrolyte level detection system for a battery including a container for battery components and a cover for the container, the detection system including fill holes in the cover and barrels depending therefrom into the container, the barrels defining a fill port and each having a lower end and an elongate semi-arcuate finger portion extending from the lower end, a first ledge parallel to the cover and extending from the finger portion and into the fill port, and a second ledge extending from an intermediate location of the barrel and into the fill port.

27. The detection system of claim 26, wherein each ledge is generally arcuate and wherein the first and second ledge are each visible when an observer looks into the fill hole and the electrolyte level in the container is below the first ledge.

28. The detection system of claim 26, wherein the first and second ledges are located within the container at set levels so that a level of electrolyte includes an upper surface located between the two ledges.

* * * * *